United States Patent
Knorr et al.

(10) Patent No.: US 7,746,064 B2
(45) Date of Patent: Jun. 29, 2010

(54) SPEED MEASUREMENT FOR AN ELECTRICAL PERMANENT-MAGNET SYNCHRONOUS MACHINE

(75) Inventors: Markus Knorr, Augsburg (DE); Zeljko Jajtic, München (DE)

(73) Assignee: Siemens Aktiengesellschaft, Munich (DE)

(*) Notice: Subject to any disclaimer, the term of this patent is extended or adjusted under 35 U.S.C. 154(b) by 416 days.

(21) Appl. No.: 11/576,025

(22) PCT Filed: Sep. 19, 2005

(86) PCT No.: PCT/EP2005/054644

§ 371 (c)(1),
(2), (4) Date: Mar. 26, 2007

(87) PCT Pub. No.: WO2006/072472

PCT Pub. Date: Jul. 13, 2006

(65) Prior Publication Data

US 2008/0066548 A1 Mar. 20, 2008

(30) Foreign Application Priority Data

Sep. 27, 2004 (DE) .................. 10 2004 046 824

(51) Int. Cl.
*G01P 3/48* (2006.01)
*G01R 33/06* (2006.01)

(52) U.S. Cl. ............... 324/174; 324/207.2; 324/207.15; 324/161

(58) Field of Classification Search ............ 324/207.2, 324/207.15, 207.16, 207.22, 207.24, 207.25, 324/161, 173, 174; 73/514.39, 514.31; 310/68 R, 310/68 B, 254, 12, 216, 184

See application file for complete search history.

(56) References Cited

U.S. PATENT DOCUMENTS

| 4,581,553 A | 4/1986 | Moczala |
| 4,710,683 A | 12/1987 | Bahn et al. |
| 5,091,665 A * | 2/1992 | Kelly ......................... 310/12 |

FOREIGN PATENT DOCUMENTS

| DE | 690 21 156 T2 | 12/1995 |
| DE | 101 35 540 A1 | 2/2003 |
| GB | 2 273 166 A | 6/1994 |
| JP | 03155362 | 7/1991 |

* cited by examiner

*Primary Examiner*—Reena Aurora
(74) *Attorney, Agent, or Firm*—Henry M. Feiereisen; Ursula B. Day

(57) ABSTRACT

The invention relates to a speed measurement device (1, 2) for a permanently excited electric synchronous machine (5, 7) comprising a first part (11, 13) and a second part (15, 17). The invention also relates to a corresponding method for measuring speed. The second part (15, 17) of the permanently excited electric synchronous machine comprises permanent magnets (19). The speed measurement device (1, 2) comprises at least one first sensor (25) and a second sensor (31), wherein the first sensor (25) is provided with a sensor coil and the second sensor (31) is a Hall sensor and the sensors (25, 31) on the first part (11, 13) are arranged in such a way that the first sensor (25) and second sensor (31) are influenced by a magnetic field (33), which is generated by the permanent magnets (19), by means of a flow conducting device (43) having an integrated character.

22 Claims, 6 Drawing Sheets

SPEED MEASUREMENT FOR AN ELECTRICAL PERMANENT-MAGNET SYNCHRONOUS MACHINE

BACKGROUND OF THE INVENTION

The invention relates to speed measurement for an electrical permanent-magnet synchronous machine. The invention relates in particular to a speed measurement device which is provided for this purpose, to a primary part of a permanent-magnet electrical synchronous machine, and to a method for measurement of the speed.

By way of example, absolute rotation transmitters are speed measurement devices for electrical machines. In the case of linear motors, by way of example, length measurement systems can be used for speed measurement. Devices such as these for measurement of a speed of an electrical rotating machine or of an electrical linear machine are complex to manufacture, and are costly to produce.

For speed-regulated or rotation-speed-regulated operation of permanent-magnet synchronous machines from a converter, it is necessary to know the absolute rotor position as well as the actual speed or rotation speed. In general, an external tachogenerator or a position transmitter, from which the rotation speed signal can be differentiated, is required for this purpose.

In the case of linear motors, a speed value for a linear movement is required instead of the rotation speed signal as the speed signal. In order to obtain a speed signal, which is required for control of the electrical machine, in particular of the permanent-magnet electrical synchronous machine, from a position signal, the position signal must be differentiated. The position signal must have high resolution for this purpose. This involves a high degree of complexity, irrespective of whether the position signal relates to a position with respect to a rotary movement or a linear movement. Particularly for linear motors and hollow-shaft motors, such as torque motors, such signal determination requires tachogenerators that are suitable for this purpose, and thus a high degree of complexity.

U.S. Pat. No. 4,710,683 discloses a device for identification of a rotary movement. A ring structure is used for movement identification, which has magnets arranged in a circular shape and is coupled to a rotary electrical machine. Furthermore, two sensors are used for movement identification and are influenced by the magnetic field of the magnets arranged in a circular shape, with Hall sensors or inductively acting sensors being used as sensors. The sensors detect the free-space field of the magnets. This is a stray field, so that the measurement by means of the sensors loses accuracy.

SUMMARY OF THE INVENTION

One object of the present invention is, in a simple manner, to provide a device which makes it possible to measure the speed of a permanent-magnet electrical synchronous machine in a simple manner, in particular with the measurement accuracy being improved.

According to one aspect of the present invention, the object is achieved by a speed measurement device for an electrical machine which has a primary part and a secondary part, with the electrical machine having permanent magnets, with the speed measurement device including at least one first sensor and one second sensor, with the first sensor having a sensor coil, and with the second sensor being a Hall sensor, wherein a flux guidance device is provided for guidance of a magnetic flux, with at least one sensor being arranged in the area of the flux guidance device in such a manner that this sensor can be used to measure the magnetic flux in the flux guidance device.

According to another aspect of the present invention, the object is also achieved by a speed measurement device for a permanent-magnet electrical synchronous machine which has a primary cart and a secondary part, wherein the speed measurement device has a first speed measurement device and a second speed measurement device, in which case the first speed measurement device is fitted and/or can be fitted in and/or to the primary part with an electrical phase offset from the second speed measurement device.

According to yet another aspect of the present invention, the object is also achieved by a primary part of a permanent-magnet electrical synchronous machine, wherein the primary part has at least one first sensor and one second sensor, with the first sensor having a sensor coil and with the second sensor being a Hall sensor with the first sensor and the second sensor being provided in particular for measurement of a speed, with one and/or more of the sensors being fitted to and/or adjacent to a flux guidance device for guidance of a motor flux of the permanent-magnet electrical synchronous machine, and with the flux guidance device having teeth.

According to yet another aspect of the present invention, the object is also achieved by a method for measurement of a speed of a machine, in particular of an electrical machine, which in particular has permanent-magnet excitation, wherein a) a magnetic field which is produced by means of permanent magnets is guided to a first sensor by means of a flux guidance device, with a position-dependent first signal value for a magnetic field being measured by means of the first sensor, and b) the magnetic field which is produced by means of the permanent magnets is guided by means of a further flux guidance device to a second sensor, with a position-dependent and speed-dependent second signal value for a magnetic field being measured by means of the second sensor, after which the first signal value is related to the second signal value. This method allows machine speed to be measured in a manner which overcomes the abovementioned problems from the prior art.

A speed measurement device can be provided for an electrical machine. The electrical machine has a primary part and a secondary part. In one refinement of the electrical machine, this machine is a permanent-magnet electrical machine, for example with the secondary part having permanent magnets. In a further embodiment of the electrical machine, the primary part has permanent magnets for excitation. The German application with the official file reference 102004045992.4 discloses examples of electrical machines whose primary part has permanent magnets. The following text is generally based on the assumption that the secondary part has permanent magnets for excitation, although the aim is therefore also to always disclose that these permanent magnets can also be used on the primary part, in which case the secondary part is then, for example, only a type of iron reaction part, which has teeth instead of permanent magnets. The speed measurement device according to the invention is also designed such that it has at least one first sensor and one second sensor. The first sensor is a sensor which operates on the induction principle, and for this purpose has a sensor coil. The second sensor operates on the Hall effect principle, and is therefore a Hall sensor. The Hall sensor has a Hall sensor element. The speed measurement device also has at least one flux guidance device in addition to the sensors which are referred to as the first sensor and the second sensor just to distinguish between them. This flux guidance device is used to guide a magnetic flux, in which case the magnetic flux can be produced, for example, by means of permanent magnets, with the permanent magnets in particular being the permanent magnets of a permanent-magnet electrical machine. According to the invention, at least one sensor is arranged in the area of the flux guidance device in such a manner that this sensor can be used to measure the magnetic flux in the flux guidance device. The sensor is arranged in the area of the flux guidance device for example by means of known connection techniques, such as: welding, adhesive bonding, interlocking. In addition to a sensor coil, the first sensor advantageously has a flux guidance piece around which the sensor coil is wound. The flux guidance piece is connected to the flux guidance device by means of the known connection technique, for example, or, for example, is formed integrally with the flux guidance device. Both the flux guidance piece and the flux guidance device may have a laminated structure. The integral nature of the flux guidance device and the flux guidance piece in this case relates to the individual laminates.

The use of a flux guidance piece allows magnetic fields to be concentrated. The concentration process makes it possible, for example, to form an increased magnetic flux, which then leads to more accurate sensor measurement results. Furthermore, flux guidance pieces considerably reduce the otherwise stringent requirements for installation position and adjustment of the sensor elements, once again increasing the accuracy and robustness of the sensor. If, for example, the permanent magnets do not have homogeneous magnetic field strengths, the flux guidance device can be used to average out the measurement of the magnetic field strength over a selected area of one and/or more permanent magnets. For example, if the flux guidance device has teeth, with the teeth being separated from the permanent magnets by an air gap, then the teeth can be configured in such a manner that the teeth and permanent magnets have opposite surfaces of approximately the same size.

The flux guidance device can result in an integrating function on magnetic fields. In one advantageous refinement of the speed measurement device, the flux guidance device therefore has teeth. The flux guidance device is in this case intended to guide a magnetic flux which can be produced in particular by means of the permanent magnets of the secondary part. The permanent magnets are advantageously the permanent magnets which are already required to form a secondary part of a permanent-magnet electrical synchronous machine according to the prior art. In a further refinement, the permanent magnets for at least one sensor of the speed measurement device are not also used to form an excited magnetic field for the secondary part of the electrical machine. The use of additional permanent magnets for at least one sensor makes it possible, for example, to improve the accuracy of the speed measurement device, because this increases the number of alternate poles per unit length in comparison to the excitation magnetic field.

In the speed measurement device according to the invention, the sensors are fitted or can be fitted in the area of the flux guidance device in such a manner that both the first sensor and the second sensor can be influenced by a magnetic field which is produced by the permanent magnets. This relates in particular to a speed measurement device for a permanent-magnet electrical synchronous machine which has a primary part and a secondary part, with the secondary part having permanent magnets as excitation, with the speed measurement device having at least one first sensor and one second sensor, with the first sensor having a sensor coil and the second sensor having a Hall sensor, and with the sensors being fitted to the primary part of the permanent-magnet electrical synchronous machine in such a manner that both the first sensor and the second sensor can be influenced by the magnetic field which is produced by the permanent magnets.

The sensors for a speed measurement device such as this can be used to produce a signal which is proportional to the rotation speed or to the speed. This makes it possible to save the use of a tachometer, which has been required in the past. The speed measurement device according to the invention provides signals for control of the permanent-magnet electrical synchronous machine, by means of which the speed of the permanent-magnet electrical synchronous machine can be recorded with high accuracy, without a position signal to be differentiated being subject to stringent accuracy requirements and/or resolution requirements. The sensor coil that is used results in a differentiating component. The rotation speed measurement which results from this represents a simple and low-cost technical solution for speed determination, both in the case of linear motors and in particular in the case of torque motors. In this case, both linear motors and torque motors are examples of synchronous motors which can be permanently excited by means of permanent magnets.

In one advantageous refinement of the speed measurement device, the flux guidance device is integrated in the primary part of the electrical machine. The primary part generally has a laminated core, which is used to guide a magnetic machine flux. This is used to build up the electromagnetic force of the motor. The magnetic machine flux is advantageously used for the sensors to measure the speed.

One or more sensors is or are therefore advantageously arranged directly in the magnetic circuit of the primary part of the electrical machine. In consequence, a component of the useful flux of the electrical machine is detected by one or more sensors of the speed measurement device. Thus, according to the invention, no free-space field is used or detected for speed measurement, with this being intended to relate either to a linear movement or a rotary movement. That magnetic flux which is also used to form the power of the electrical machine, or else the power of a motor, is detected as a sensor flux. The use of a useful flux of the electrical machine, that is to say of a magnetic flux which is used for power generation, means that the sensor flux resulting from this is not so heavily dependent on geometric and magnetic tolerances and/or faults of individual permanent magnets in a permanent-magnet electrical machine, as would be the case, for example, with point detection of the free-space field of permanent magnets. One reason for this is that the useful flux, that is to say in particular the motor flux of a motor, is collected by a magnetic circuit of the electrical machine, and thus represents a type of integral variable. In particular, the effects of local errors or faults in the field distribution are very greatly reduced by "integration" in this integral variable. The integration effect is achieved in particular by the flux guidance of a laminated core. The integrating effect in the case of useful flux may have various advantages:

- the use of the useful flux (in the case of a motor, this is the motor flux) as an integral variable improves the signal quality factor for at least one of the sensors that are also used for speed measurement (sensor with a coil (sensor coil) or Hall sensor);
- in addition to a generally improved signal form, the signal form can also be optimized by variation of the magnetic circuit geometry; for example, this makes it possible to achieve better position detection (in this context, it should be noted that at least one sensor of the speed measurement device can also be used for position detection);
- position detection errors can be minimized by the achievement of less sensitivity to at least one local error or fault of a permanent magnet; examples of a local error or fault are: a discrepancy from the required magnetization strength and/or magnetization direction, a discrepancy of a permanent magnet from the required geometry (in particular of the thickness which, for example, influences the distance between a primary part and a secondary part of an electrical machine), etc.

According to the invention, these advantages can be achieved not only by the use of the useful flux. In order to achieve the described advantages, it is also possible to achieve the integrating effect described above by, for example, a means for magnetic flux guidance (for example a laminated core) for example, which is not used to carry a useful flux. In this case, it would then also be less problematic to choose as the means for magnetic flux guidance not only a laminated core but also a design in which Eddy currents are completely excluded, in comparison to the laminated core. This design is, for example, a soft-magnetic block composed of ferrite or some other soft-magnetic material (for example powder pressed cores), which has teeth or else a plastic block in which soft-magnetic material is integrated.

Thus, in one embodiment of the invention, at least one sensor of the speed measurement device can be arranged outside a primary magnetic circuit. At least parts of the primary magnetic circuit correspond to the magnetic circuit of the useful flux. In order to improve the signal quality by the integrating effect, for example of the laminated core or else a design corresponding thereto, the area of one or more sensors can in this case be designed in particular in a manner corresponding to a laminated core of the primary part. The displacement of at least one sensor of the speed measurement device outside the useful flux of the electrical machine has the advantage that, for example, motor winding coils through which currents are passing have less influence on the sensor. This makes it possible to avoid, or at least reduce, magnetic disturbance fields which can be caused by current flowing through a primary part of the electrical machine. This makes it possible to increase not only the accuracy of the speed measurement device but also the accuracy of a position measurement device.

In consequence, the invention has considerable advantages over the prior art with sensor elements which are arranged outside the magnetic circuit of the primary part of the electrical machine. The prior art has the disadvantage that the free-space field (stray field) of the permanent magnets of the secondary part is detected.

According to the invention, the strong influence of local errors or faults in the field distribution of individual permanent magnets is reduced, since the free-space field (stray field) is no longer detected for signal detection. Until now, with the prior art, it has been necessary for accurate measurement for:

the stray field to have a sinusoidal distribution,
the geometry of the sensor coil to be very accurate, and/or
the distance between the Hall sensor (that is to say the Hall element) and a magnet surface to be maintained exactly.

Until now, compliance with these requirements has resulted in high costs. According to the invention, requirements such as these can now be reduced. This is a result in particular of the fact that the measurement signal of the Hall sensor is based on a point variable and, until now, the induction distribution has been measured in the stray field of the permanent magnets. According to the invention, the Hall sensor measures the useful flux, so that induction distributions in the permanent magnets have a negligible effect on the measurement result. The measurement signal in the sensor coil is based on an integral variable, in which case, according to the prior art, the area integral of the magnetic stray field was measured over the coil area. Maintenance of an exact coil geometry was therefore elementary. According to the invention, the sensor coil surrounds a flux guidance piece, with this flux guidance piece being used to guide a portion of the magnetic useful flux. This therefore also advantageously reduces the requirements for an exact coil geometry.

The sensors which are used for the speed measurement device can also be used for a position measurement device, so that the invention also relates to a position measurement device. The embodiments of the sensors described in conjunction with the speed measurement device, and their arrangement, also relate to the position measurement device.

In the speed measurement device, the first sensor and the second sensor can be used to measure magnetic fields which are produced in particular by a secondary part fitted with permanent magnets. The signal from the Hall sensor is position-dependent. The signal from the sensor coil is dependent not only on position but also on speed. The signal from the Hall sensor is now used in order to eliminate the position-dependent component of the signal from the sensor coil.

In one advantageous refinement, the first sensor and the second sensor can be connected or are connected to an evaluation device there for determination of the speed of the permanent-magnet electrical synchronous machine. By way of example, the evaluation unit is a separate unit in which the signals from the two sensors are processed, or else an integrated evaluation unit. The evaluation unit integration is carried out for example in a programmable logic controller (PLC), a closed-loop or open-loop control unit for a converter, or the like. By way of example, the evaluation unit has hardware means and/or software means.

A portion of the main machine flux can be detected by means of the first sensor and by means of the second sensor. In this case, the first sensor and the second sensor are located, for example, adjacent to and/or in the primary part of the electrical machine. In a further possible embodiment, the two sensors—the first sensor and the second sensor—or else only one of the sensors are or is arranged outside the laminated core area of the primary part. In this case, the two sensors are arranged in such a manner that they detect the magnetic flux of the permanent magnets of the secondary part, which are not covered by the laminated core of the primary part. These permanent magnets which are not covered by the laminated core of the primary part are free-standing. With this arrangement of the sensors, these sensors are arranged outside a magnetic circuit of the primary part. In particular, the magnetic circuit of the primary part is governed essentially by the laminated core of the primary part. If a sensor detects a magnetic field or a magnetic flux outside the magnetic circuit of the primary part, then the sensor can either be fitted to the primary part such that the sensor is integrated in the primary part, or such that the sensor is fitted to the primary part by means of a holding device. If a holding device is used, the sensor is located, for example, in a separate sensor box which is fitted to the primary part, with the sensor box being separated from permanent magnets of the primary part via an air gap.

The sensors for the speed measurement device are thus arranged either outside a magnetic circuit of the primary part or within a magnetic circuit of the primary part. If one sensor is arranged within the magnetic circuit of the primary part, then this sensor is arranged adjacent to and/or in the laminated core of the primary part.

The signals detected by the sensors are in general sinusoidal. For example, a voltage $U_s$ can be determined as a signal from the sensor coil. In this case, this voltage $U_s$ has a proportionality which can be represented as follows:

$$U_s \sim K1 \cdot \phi(\alpha) \cdot d\alpha/dt$$

(the coil signal $U_s$ is dependent on position and rotation speed)

where:
K1 is a proportionality constant,
$\phi(\alpha)$ is a magnetic flux (dependent on angle and position),
$d\alpha/dt$ is an angular velocity and
$\alpha$ is an angle position in the case of a rotating machine, or a position in the case of a linear motor.

The signal from the Hall sensor $U_h$ is dependent only on position. The voltage $U_h$ is proportional to the magnetic flux $\phi$. This proportionality can be described, for example, as follows:

$$U_h \sim K2 \cdot \phi(\alpha)$$

where:
K2* is a constant, and
$\phi(\alpha)$ is a magnetic flux (dependent on angle and position).

Suitable arrangement of the two sensors allows the two sinusoidal signals to have an identical phase angle. The ratio of the voltages of the sensor signals $U_s/U_h$ is directly proportional to the rotation speed or to the speed. By way of example, the speed relates to the speed of a primary part of a linear motor. The position dependency of the signal from the sensor coil can be eliminated by means of the Hall sensor. For example, the rotation speed then becomes: $n = K*(U_s/U_h)$.

In one advantageous refinement of the speed measurement device, the first sensor and second sensor have an electrical phase offset as already mentioned. One particularly advantageous electrical phase offset results from an offset angle of 90° electrical.

The invention is also achieved by means of a speed measurement device for a permanent-magnet electrical synchronous machine, which has a primary part and a secondary part and also has at least two speed measurement devices of the type described above. This upgraded speed measurement device thus has a first speed measurement device and a second speed measurement device, in which case the first and the second speed measurement devices can be fitted or are fitted to the primary part with an electrical phase offset. In one advantageous refinement, the phase offset is 90° or 270°. This makes it possible to achieve a rotation-speed actual-value signal which can be evaluated, at the zero crossings of the sinusoidal function.

In a further advantageous refinement, it is possible to compensate for disturbance signals which can be caused in the sensor signals by the current flowing through the primary part windings. The known currents in the primary part windings are used to compensate for the disturbance signals on the signals from the first and the second sensor, or further sensors. The magnetic fields which are detected by the sensors can be determined from the known electric currents which are flowing through the windings and can thus be calculated out from the total signal from a sensor which receives not only a signal from the magnetic field from the winding in which a current is flowing but also from the magnetic field of the permanent magnets. The signals from the sensors may be processed both in analogue form and in digital form. The evaluation can be carried out by means of the evaluation device as already described above.

According to the invention, a primary part of a permanent-magnet electrical synchronous machine can be designed in such a manner that the primary part has at least one first sensor and one second sensor, with the first sensor having a sensor coil and with the second sensor being a Hall sensor or having at least one Hall sensor, with the first sensor and the second sensor being intended in particular to measure a speed. One or more of the sensors is or are in this case fitted adjacent to and/or on a flux guidance device for guidance of a magnetic motor flux of the permanent-magnet electrical machine. The flux guidance device is in this case designed such that it has teeth. The flux guidance device is at least a part of the primary part, with the teeth facing the secondary part. The sensor coil is advantageously wound around a flux guidance piece, with the flux guidance piece being provided for guidance of at least a portion of the useful flux (in particular motor flux) of the electrical machine.

In one refinement, the primary part therefore has a speed measurement device of the type described above. The first sensor and the second sensor are advantageously fitted to the primary part such that both the first sensor and the second sensor can be influenced by a magnetic field which can be produced by permanent magnets in particular of a secondary part. The permanent magnets may also be arranged on the primary part, in which case the secondary part then has teeth. These teeth of the secondary part face the primary part. The effect described above results from the fact that at least a portion of the magnetic flux path is closed via the sensor device.

In a further advantageous refinement, the first sensor and the second sensor have an electrical phase offset. The phase offset makes it possible to simplify the computational processing of the sensor signals. By way of example, a phase lead of 90° electrical is chosen for one advantageous refinement.

The primary part according to the invention is advantageously also designed such that it has a first speed measurement device and a second speed measurement device, with the first speed measurement device having a first second sensor and the second speed measurement device having a third and fourth sensor with the third sensor being a Hall sensor and the fourth sensor having a sensor coil. Since two speed measurement devices are provided for one primary part, these can be arranged with an electrical phase offset on the primary part. With a phase-offset arrangement, it is possible during a movement of the primary part with respect to the secondary part to determine speed in specific positions, even when the sine is zero. A sine which is equal to zero is problematic in particular when this sine is used in an equation for determination of the speed and the sine is used in a denominator in this equation. A second speed measurement device is therefore now provided, and can overcome this disadvantage.

The Hall sensor of a primary part is advantageously also used for determination of a rotor position. In a rotary machine, the determination of the rotor position relates to the position of the rotor, and in the case of a linear motor it relates to the position of the secondary part. The rotor position is thus advantageously determined by evaluation of signals from the Hall sensor, with these signals from the Hall sensor being used, together with the signals from the sensor which has a sensor coil, to determine the speed.

At least one of the sensors used for the speed measurement device is advantageously also used for generation of a position signal for the secondary part or the primary part. This makes it possible, for example, to operate an electrical machine on a position-controlled basis, without any additional, that is to say external, position transmitter. Signals from the Hall sensor can be used as a position transmitter for position-controlled operation of the electrical machine. The method includes evaluation, suitable interpolation of the Hall signals and subsequent referencing to an absolute position. A "teach-in process" can also be carried out. This process can be used for position-controlled operation of the motor.

The referencing to an absolute position can be carried out by means of a temporary external transmitter signal (for example as part of the setting up or connection of the electrical machine), during which process any inaccuracy that may exist in a Hall position signal is compensated for. Inaccuracies can occur, for example, as a result of mechanical or magnetic tolerances of a section of permanent magnets on the secondary part. The section of permanent magnets on the secondary part is used in particular as a scale for the speed measurement device according to the invention.

The nominal position is "learnt" directly using a "teach-in process", and is related to a Hall position signal. The Hall position signal may then have absolute position inaccuracies. Once the nominal position has been "learnt", it can nevertheless be reproduced exactly and repeatedly by means of the "motor's-own" Hall signals (for example for a controlled point-to-point movement process).

Data relating to the speed, which data can be determined by means of the speed measurement device and may relate either to a linear speed or a speed of rotation, can also be used for position control by integrating the speed signal to form a position signal. This makes it possible to achieve a high position-signal quality factor.

In a further refinement, it is also possible when using only one speed measurement device to use two sensors to mask out the positions at which the sine is zero.

In one method for measurement of a speed of a permanent-magnet electrical machine, a position-dependent first signal value for a magnetic field is measured by means of a first sensor, and a position-dependent and speed-dependent second signal value for a magnetic field is measured by means of a second sensor. After measurement, the first signal value is related to the second signal value. This has already been described further above. In this case, advantageously:

a) a magnetic field which has been produced by means of permanent magnets is guided by means of a flux guidance device to a first sensor, with a position-dependent first signal value for a magnetic field being measured by means of the first sensor, and b) the magnetic field which has been produced by means of the permanent magnets is guided by means of a further flux guidance device to a second sensor, with a position-dependent and speed-dependent second signal value for a magnetic field being measured by means of the second sensor, after which the first signal value is related to the second signal value.

In one refinement of the method, a flux guidance device is used which has teeth, with the teeth being positioned opposite the permanent magnets.

As already described, it is also advantageous to compensate for any signal disturbance. The signal disturbance is caused, for example, by currents flowing through the primary part windings. Only the magnetic field which is produced by the permanent magnets is necessary in order to measure the speed of the electrical machine. The magnetic field caused by the current flow through the windings has to be compensated for. The signal disturbance to the first value and to the second value caused by the current flow is in this case calculated out, for example, by means of the evaluation device. By way of example, a reference current can be caused to flow for this purpose, in which the actual values of the electric currents and the nominal values of the electric currents are measured and are preprocessed with the measured magnetic fields in the sensors in such a manner that a magnetic field caused by the current flow in the windings can be eliminated from the measurement of the speed of the electrical machine.

BRIEF DESCRIPTION OF THE DRAWING

Exemplary embodiments of the invention will be explained on the basis of sketches using the attached drawing, in which.

DETAILED DESCRIPTION OF PREFERRED EMBODIMENTS

Figure 1:
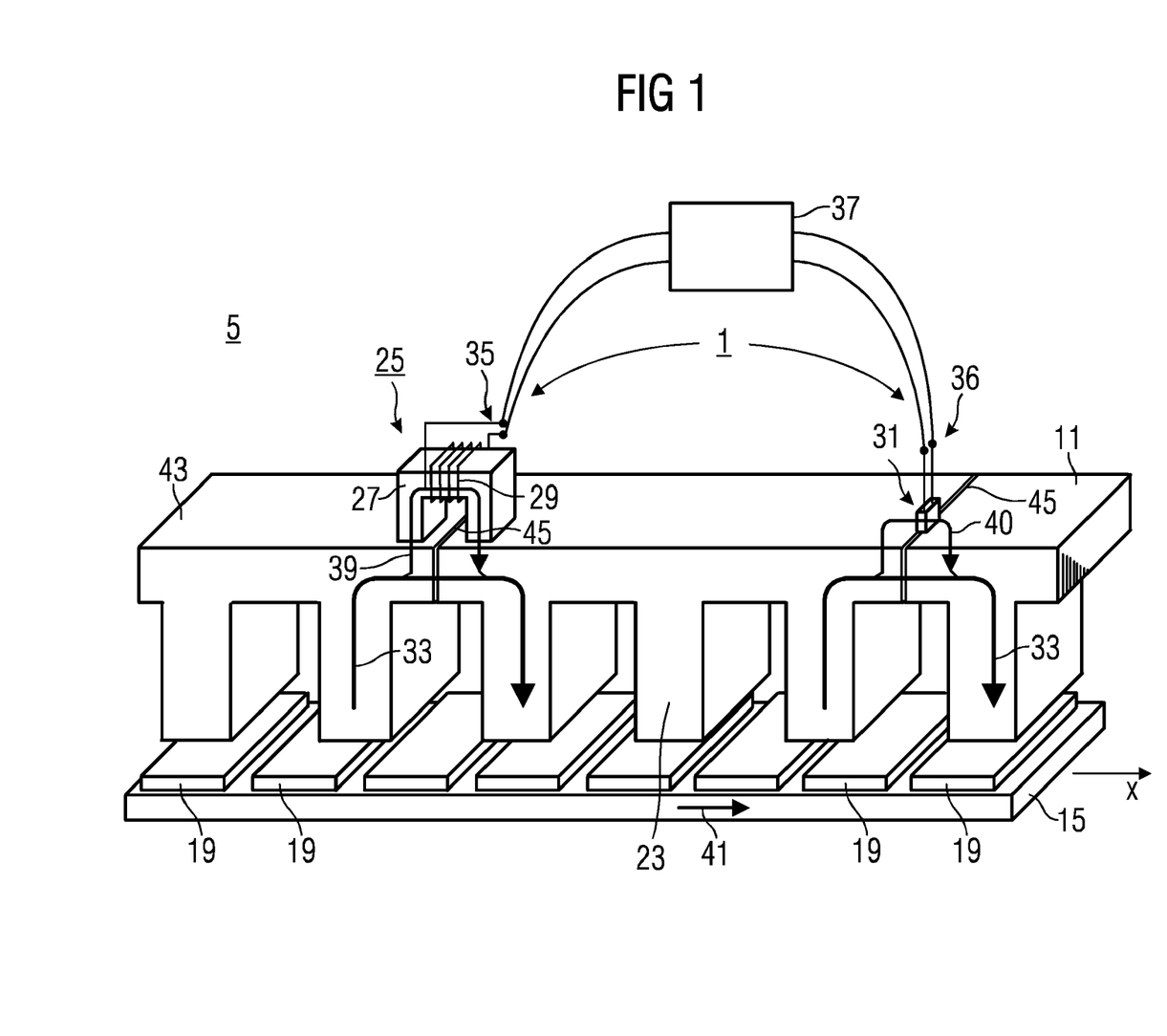
FIG. 1 shows a primary part and a secondary part of a primary motor.

The illustration in FIG. 1 shows a speed measurement device 1. The speed measurement device 1 has a first sensor 25 and a second sensor 31. The second sensor 31 is a Hall sensor. The first sensor 25 has a sensor coil 29. The sensor coil 29 is wound around a flux guidance piece 27. The flux guidance piece 27 is used for partial flux diversion of a magnetic flux which is represented by the magnetic flux 33 through the flux guidance piece 27. This diverted flux is the magnetic sensor flux 39. The sensor coil 29 surrounds the magnetic sensor flux 39. The first sensor 25 and the Hall sensor 31 are located adjacent to a primary part 11. The primary part 11 has a notch 45 in the area of the sensors adjacent to the primary pad 11. The notch 45, which represents an air gap between adjacent laminated cores of the primary part, is used to optimize and/or to influence the amplitude of the sensor flux 39, and thus the sensitivity of the sensor. The primary part 11 also has teeth 23, with windings being provided between the teeth, although these are not illustrated in FIG. 1. Windings through which a current can flow can be used to produce a magnetic field. A magnetic field is also produced by means of permanent magnets 19. The permanent magnets 19 are part of a secondary part 15.

The secondary part 15 and/or the primary part 11 can move linearly. The movement direction is indicated by an arrow 41, in which case the direction may be both positive and negative. The movement direction runs, for example, along an axis x. A magnetic field 33 can be produced by means of the permanent magnets 19. The magnetic field 33 runs, inter alia, within the primary part 11. Since the magnetic field can be differentiated only with difficulty from the magnetic flux in the drawing, the same reference signal 33 is used for both. Different magnetic fluxes φ occur, depending on the position of the primary part 11 with respect to the secondary part 15. By way of example, the flux $\phi_0 = \phi \sin x$ is illustrated in the area of the first sensor 25. The magnetic flux $\phi_{90} = \phi \cos x$ is illustrated in the area of the Hall sensor 31. A magnetic sensor flux 40 is tapped off from this magnetic field 31. The primary part 11 is designed such that it has a laminated core 43.

The use of a laminated core allows Eddy currents to be reduced. The laminated core 43 is a flux guidance device for the magnetic flux 33. The flux guidance piece 27 is seated on this flux guidance device and has the sensor coil 29 wound around it in such a manner that a portion of the magnetic useful flux is guided as the sensor flux 39 through the flux guidance piece 27.

The signal values determined by the sensors can be transmitted by means of connections 35 and 36 to an evaluation device 37. For example, the sensor coil signal can thus be transmitted as a voltage $U_s$ proportional to $\phi(x)*v$ (v is the speed), and the Hall voltage $U_h$ proportional to $\phi(x)$ for the Hall sensor 31.

The evaluation device 37 is, for example, a separate evaluation device for the sensors 25, 31 or else an evaluation device which is provided in the case of an already existing device for open-loop or closed-loop control of the electrical machine. This is provided, for example, for open-loop or closed-loop control of a converter, although the converter is not illustrated in FIG. 1. A permanent-magnet electrical synchronous machine 5, which is illustrated in FIG. 1, and has a primary part 11 and a secondary part 15, can be driven with the aid of the converter. The described invention can be used not only for electrical machines whose secondary part has the permanent magnets for excitation but also for electrical machines in which the primary part has the permanent magnets for excitation. However, no such electrical machine is illustrated in FIG. 1.

Figure 2:
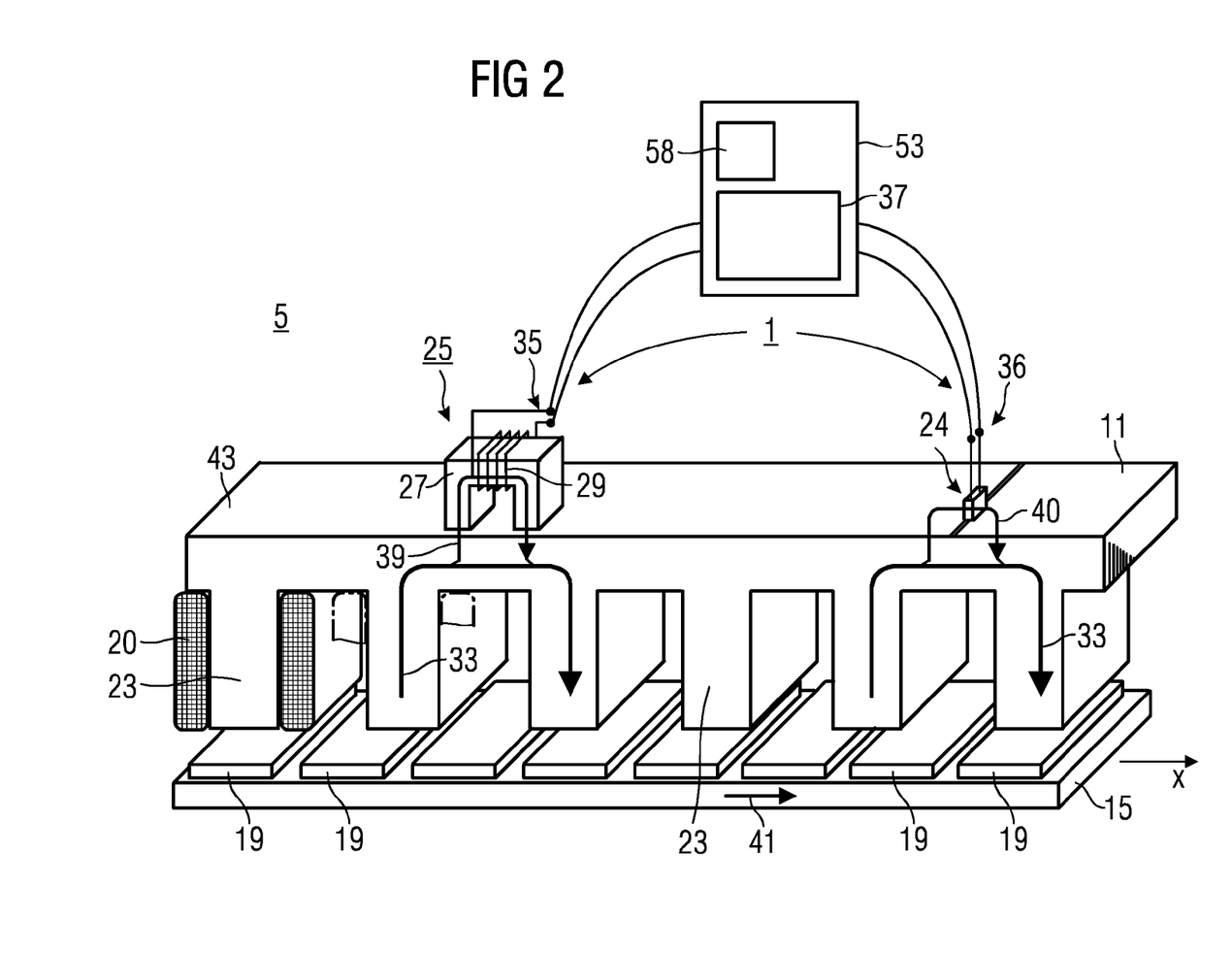
FIG. 2 shows a more detailed illustration corresponding to FIG. 1.

The illustration in FIG. 2 corresponds essentially to that in FIG. 1. In FIG. 2, a tooth 23 is additionally shown, around which a winding 20 of the primary part 11 is passed. The primary part 11 has a plurality of windings 20, although only one winding 20 is illustrated, in order to improve the clarity. A further modification from FIG. 1 results from the fact that the notch 45 is no longer formed in all areas of the laminated core 43 which acts as the flux guidance device. According to FIG. 2, the evaluation device 37 is advantageously integrated in a converter 53. In addition, a compensation device 58 can also be integrated, as illustrated, in this converter 53. This compensation device is used to compensate for the sensor signal disturbances caused by the current flowing in the electrical machine. The sensor, which is in the form of the Hall sensor 31 in FIG. 1, is in the form of a second sensor 24 in FIG. 2. Both the first sensor 25 and the second sensor 24 use a portion of the magnetic useful flux of the electrical machine as the signal to be measured.

Figure 3:
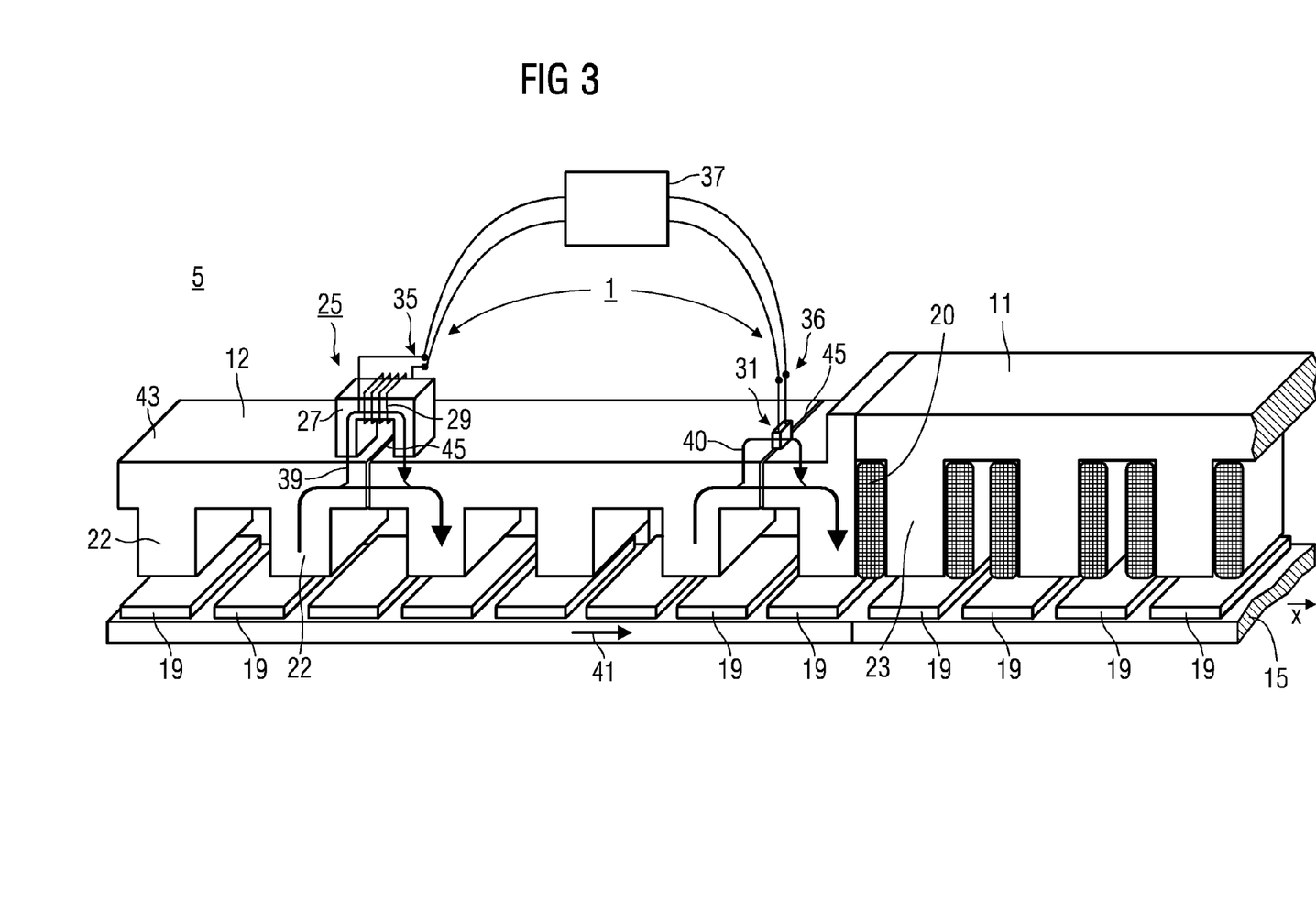
FIG. 3 shows a separate flux guidance device.

The illustration in FIG. 3 shows a separate flux guidance device 12. The first sensor 24 and the second sensor, as the Hall sensor 31, are arranged on this separate flux guidance device 12. The separate flux guidance device 12 has teeth 22. Apart from the fact that the separate flux guidance device 12 is not formed as a primary part of an electrical machine, so that the teeth 22 are not surrounded by windings either, the rest of the design corresponds essentially to that in the illustrations in FIG. 1. The separate flux guidance device 12 is used as the basis for a separate speed measurement device, with this being used in particular for measurement of a speed of a primary part with respect to a secondary part. As illustrated in FIG. 3, the separate flux guidance device 12 can be directly adjacent to the primary part 11, and can be connected to it, for example by means of a screw connection or else integrally.

Figure 4:
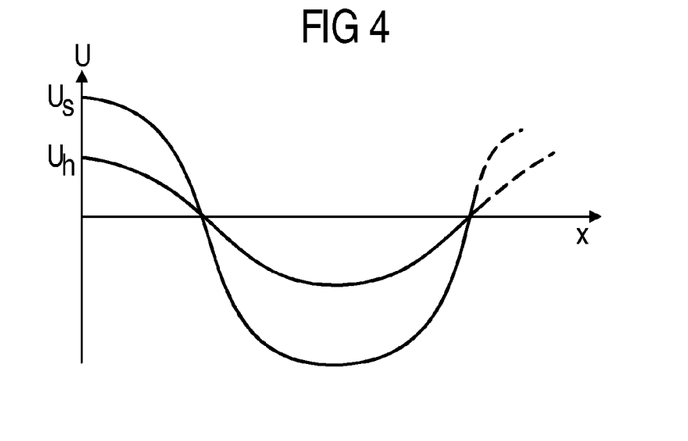
FIG. 4 shows two signal values from two sensors.

The illustration in FIG. 4 shows two curves $U_s$ and $U_h$. One curve $U_s$ represents the profile of the voltage U across the sensor coil. Curve $U_h$ represents the voltage U across the Hall sensor as a function of the position on the x axis. Both curve profiles are sinusoidal. The voltages $U_s$ and $U_h$ are plotted with respect to the position x.

Figure 5:
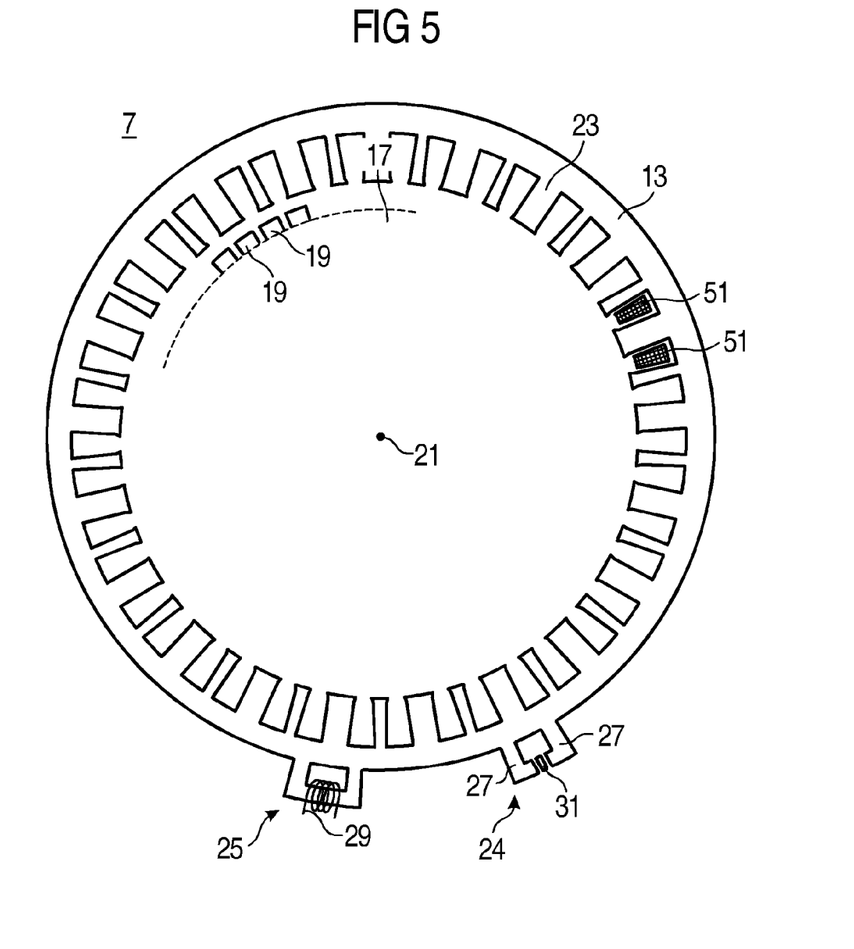
FIG. 5 shows the basic design of a rotary permanent-magnet electrical synchronous machine.

The illustration in FIG. 5 shows a sketch of a rotary permanent-magnet synchronous machine 7, in the form of a cross section. The illustration shows the laminate section of a primary part 13 and the position of a secondary part 17. The secondary part 17 is arranged rotationally symmetrically with respect to an axis 21, with the secondary part 17 having permanent magnets 19 on its side facing the primary part 13. The primary part 13 has teeth 23, with windings 51 being arranged between the teeth. However, only one winding 51 is illustrated, for clarity reasons. The illustration in FIG. 3 also shows a first sensor 25 which has a sensor coil 29. FIG. 5 discloses a Hall sensor 31 as the second sensor 24, which is linked via flux guidance pieces 27 to the flux, produced by the permanent magnets 19, from the primary part 13. The illustration in FIG. 5 discloses that a speed measurement device according to the invention can be used both for a linear motor and for a rotary electrical machine, in particular a permanent-magnet electrical synchronous machine.

Figure 6:
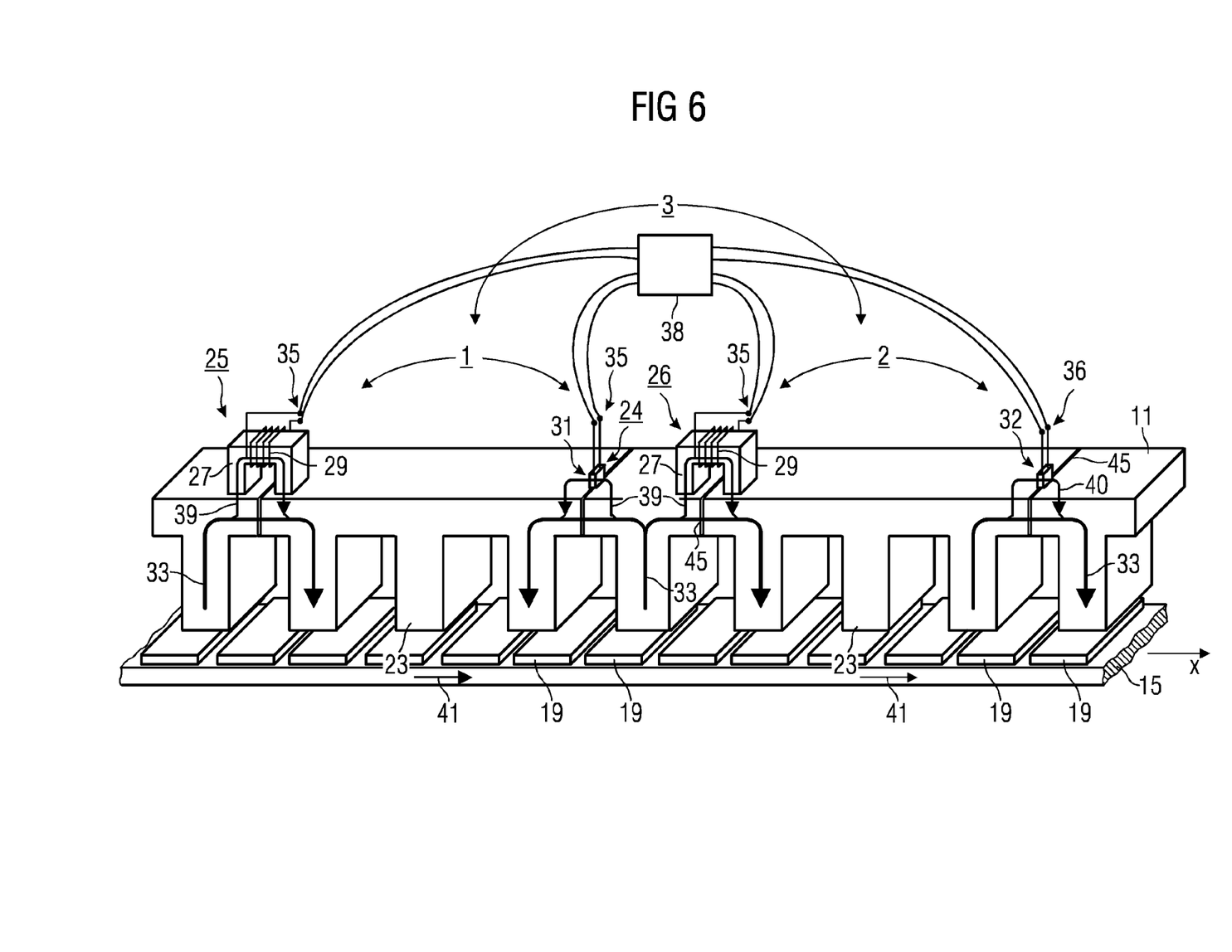
FIG. 6 shows a speed measurement device which has four sensors.

The illustration in FIG. 6 shows a speed measurement device 3, which has two subordinate speed measurement devices 1 and 2. The speed measurement devices 1 and 2 are configured corresponding to the illustration in FIG. 1. The signals from the two speed measurement devices 2 are combined in an evaluation device 38. It is now possible to use the electrical phase offset between the two speed measurement devices 1 and 2 in the evaluation device 38 to achieve continuous determination of the speed in a simple manner, since at least two further signal values are free of zero crossings even when one of the signal values from one sensor is crossing zero. The illustration in FIG. 6 thus shows a speed measurement device 3 which has four sensors, a first sensor 25, a second sensor 24 which has a Hall sensor 31, a third sensor 32 and a fourth sensor 26.

Figure 7:
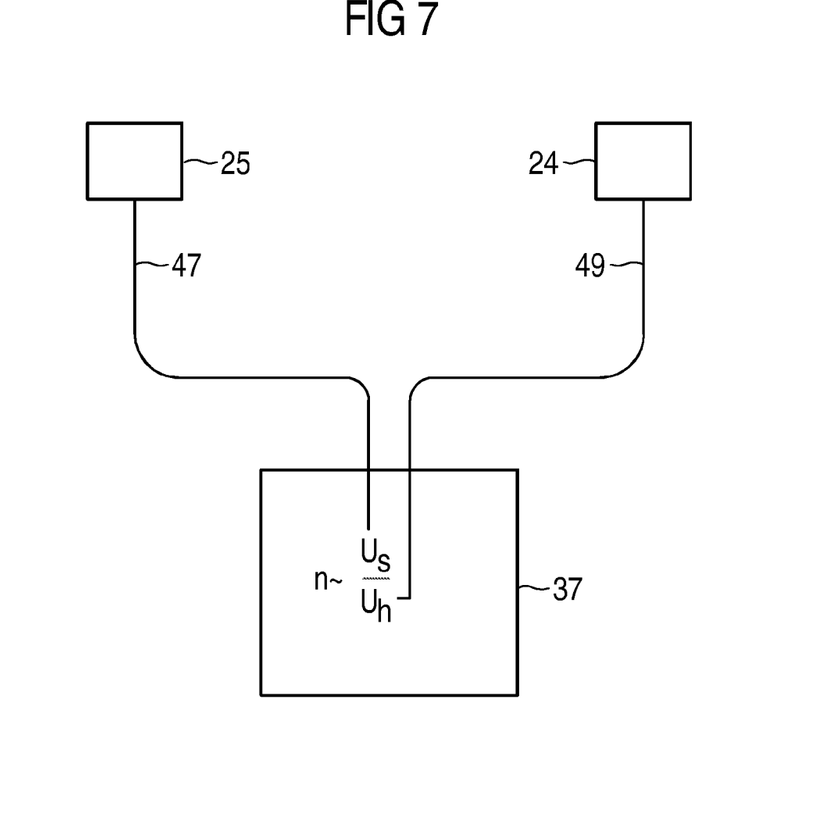
FIG. 7 shows, schematically, the processing of the signal values from the sensor.

The illustration in FIG. 7 shows, schematically, the processing of signal values from the sensors. A first sensor 25 produces a first signal value 47. A second sensor 24 which, for example, has a Hall sensor or is a Hall sensor, produces a second signal value 49. The signal values 47 and 49 are passed to an evaluation device 37. The first signal value which, for example, is a coil value and the second signal value which, for example, is a Hall voltage, are related in the evaluation device 37. This ratio is proportional to a speed n. The speed n relates, for example, to the rotation of a rotor of a permanent-magnet electrical synchronous machine, that is to say to the rotation of a secondary part which has laminated cores, or else the speed of a primary part or of a secondary part of a linear motor.

Figure 8:
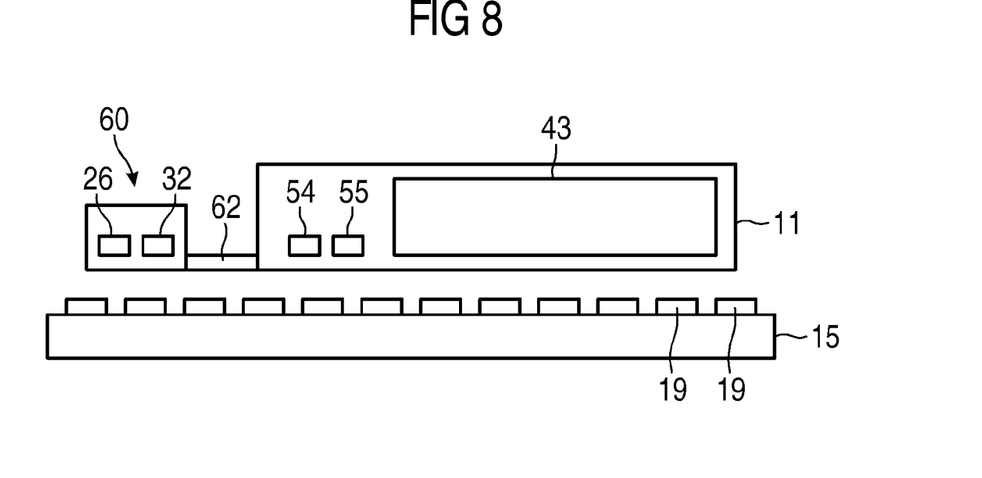
FIG. 8 shows an arrangement of sensors in an external sensor housing.

The illustration in FIG. 8 shows a linear motor which has a primary part 11 and a secondary part 15. The secondary part 15 has permanent magnets 19. A first sensor 55 and a second sensor 54 are offset from a laminated core 43 of the primary part 11 in the illustrated embodiment of the invention. The first sensor 55 and the second sensor 54 are, however, still within the primary part 11. In a further embodiment, the sensors are located outside the primary part 11. As shown in FIG. 8, the sensors 26, 32 can also be located in a sensor housing 60. In this case, there is no need for the primary part 11 to also have sensors. As shown in FIG. 8, the primary part 11 also has sensors 24 and 25. The sensor housing 60 is connected via a connecting piece 62 to the primary part 11, such that the sensor housing 60 can move together with the primary part. The use of four sensors 24, 25, 26 and 32 as in FIG. 8 results in a similar embodiment to that described in FIG. 4, with the sensors being in different positions in FIGS. 6 and 8. In FIG. 8, the sensors 24, 25, 26 and 32 are arranged in such a manner that they detect the magnetic flux of the free-standing permanent magnets, which are not covered by the laminated core 43, in the secondary part 15. The exemplary embodiment in FIG. 8 shows that the one and/or alternatively more sensors can not only be arranged on the laminated core but can also be separated from the laminated core on the primary part, or else can be arranged outside the primary part. The sensors within the sensor housing 60 correspond to a first and a second sensor of a speed measurement device, in which case, in FIG. 8, these can also be referred to as third and fourth sensors, in addition to the sensors 54 and 55. The accuracy of the measurement can advantageously also be improved by increasing the number of sensors, and by common signal evaluation.

What is claimed is:

1. A speed measurement device for an electrical machine, which has a primary part, a secondary part, and permanent magnets said speed measurement device comprising:
    a first sensor having a sensor coil which generates a first signal value having a position-dependent component and a speed-dependent component;
    a second sensor constructed as a Hall sensor to generate a position-dependent second signal value to eliminate the position-dependent component of the sensor coil;
    a flux guidance device for guidance of a magnetic flux, wherein at least one of the first and second sensors is arranged in an area of the flux guidance device and configured to measure the magnetic flux in the flux guidance device; and
    an evaluation device relating the first signal value to the second signal value, wherein a ratio between the first signal value and the second signal value is proportional to the speed of the machine.

2. The speed measurement device of claim 1, wherein the second sensor is arranged in another area of the flux guidance device.

3. The speed measurement device of claim 2, wherein the first and second sensors are positioned in the areas of the flux guidance device such that the first and second sensors can be influenced by a magnetic field produced by the permanent magnets.

4. The speed measurement device of claim 1, wherein the flux guidance device has teeth, with the magnetic flux generated by the permanent magnets of the electrical machine.

5. The speed measurement device of claim 4, wherein the permanent magnets are components of the secondary part of the electrical machine.

6. The speed measurement device of claim 1, wherein the flux guidance device is integrated in the primary part of the electrical machine.

7. The speed measurement device of claim 1, wherein at least one of the first and second sensors is arranged outside a magnetic circuit of the primary part.

8. The speed measurement device of claim 1, wherein at least one of the first and second sensors is arranged within a magnetic circuit of the primary part.

9. The speed measurement device of claim 1, wherein the first and second sensors are connectable to the evaluation device for determination of a speed of a permanent-magnet electrical synchronous machine.

10. The speed measurement device of claim 1, wherein the first sensor has an electrical phase offset from the second sensor.

11. A speed measurement assembly for a permanent-magnet electrical synchronous machine which has a primary part and a secondary part, said speed measurement assembly comprising an evaluation device, and two speed measurement devices operatively connected to the evaluation device, each speed measurement device including a first sensor having a sensor coil which generates a first signal value having a position-dependent component and a speed-dependent component, a second sensor constructed as a Hall sensor to generate a position-dependent second signal value to eliminate the position-dependent component of the sensor coil, and a flux guidance device for guidance of a magnetic flux, wherein at least one of the first and second sensors is arranged in an area of the flux guidance device and configured to measure the magnetic flux in the flux guidance device, wherein one of the speed measurement devices is constructed for attachment in and/or to the primary part with an electrical phase offset from the other one of the speed measurement devices, wherein the evaluation device relates the first signal value to the second signal value of each of the speed measurement devices, wherein a ratio between the first signal value and the second signal value is proportional to the speed of the machine.

12. A primary part of a permanent-magnet electrical synchronous machine, comprising:
    a first sensor having a sensor coil which generates a first signal value having a position-dependent component and a speed-dependent component;
    a second sensor constructed as a Hall sensor to generate a position-dependent second signal value to eliminate the position-dependent component of the sensor coil, wherein the first and second sensors are configured for measurement of a speed;
    a flux guidance device for guidance of a motor flux of the permanent-magnet electrical synchronous machine, with at least one of the first and second sensors being constructed for attachment to or adjacent to the flux guidance device, wherein the flux guidance device has teeth; and
    an evaluation device relating the first signal value to the second signal value, wherein a ratio between the first signal value and the second signal value is proportional to the speed of the machine.

13. The primary part of claim 12, wherein the first and second sensors are positioned in such a manner that the first and second sensors can be influenced by a magnetic field produced by permanent magnets of the permanent-magnet electrical synchronous machine.

14. The primary part of claim 13, wherein the permanent magnets are components of a secondary part of the permanent-magnet electrical synchronous machine.

15. The primary part of claim 12, wherein the first sensor has an electrical phase offset from the second sensor.

16. The primary part of claim 12, wherein the first and second sensors are components of a first speed measurement device, further comprising a second speed measurement device having a third sensor, and a fourth sensor, with the third sensor being a Hall sensor, and with the fourth sensor having a sensor coil.

17. The primary part of claim 12, wherein the Hall sensor is constructed for determining a rotor position.

18. The primary part of claim 12, wherein at least one of the first and second sensors is arranged outside a magnetic circuit of the primary part.

19. The primary part of claim 12, wherein at least one of the first and second sensors is arranged within a magnetic circuit of the primary part.

20. A method for measurement of a speed of a machine, said method comprising the steps of:
    guiding a magnetic field produced by permanent magnets of the machine by a flux guidance device to a first sensor which measures a magnetic field to generate a first signal value having a position-dependent component and a speed-dependent component;
    guiding the magnetic field by means a further flux guidance device to a second sensor, which measures the magnetic field to generate a position-dependent second signal value to eliminate the position-dependent component of the first signal value; and relating the first signal value to the second signal value, wherein a ratio between the first signal value and the second signal value is proportional to the speed of the machine.

21. The method of claim 20, further comprising the step of constructing one of the flux guidance devices with teeth placed in opposition to the permanent magnets.

22. The method of claim 20, wherein signal disturbances of the first signal value and of the second signal value, caused by a current flowing in a primary part, and further comprising the step of compensating the signal disturbances by a compensation device.

* * * * *